July 2, 1935. T. VAILE ET AL 2,007,030
MACHINE FOR FORMING LOOPS IN BOUND BOX WIRES
Filed Nov. 5, 1934 9 Sheets-Sheet 1

Fig. 1

Inventors:
Theodore Vaile
and Francis E. Vonderahe
By Banning & Banning
Attys

July 2, 1935. T. VAILE ET AL 2,007,030
MACHINE FOR FORMING LOOPS IN BOUND BOX WIRES
Filed Nov. 5, 1934  9 Sheets-Sheet 3

Inventors:
Theodore Vaile
and Francis E. Vonderahe,
By Banning & Banning
Attys.

July 2, 1935.  T. VAILE ET AL  2,007,030
MACHINE FOR FORMING LOOPS IN BOUND BOX WIRES
Filed Nov. 5, 1934  9 Sheets-Sheet 9

Inventors:
Theodore Vaile
and Francis E. Vonderahe
By Banning & Banning
Attys.

Patented July 2, 1935

2,007,030

UNITED STATES PATENT OFFICE 2,007,030

MACHINE FOR FORMING LOOPS IN BOUND BOX WIRES

Theodore Vaile and Francis E. Vonderahe, Kokomo, Ind., assignors to Continental Steel Corporation, Kokomo, Ind., a corporation of Indiana Application November 5, 1934, Serial No. 751,474

22 Claims. (Cl. 140—104)

The machine of the present invention is designed primarily to form loops in the ends of wires secured to the knock-down sections of a wire bound box, although the loop forming and wire coiling mechanism employed may be used in the formation of wire loops otherwise employed than as fastenings for wire bound boxes.

As presented to the machine, the four sections of a wire bound box are laid out in plane or flatwise relation with the ends of the wires upstanding or at right angle to the plane of the box sections, and in this position the wire ends are presented standing vertically to the loopers and coilers, although it will be understood that throughout the specification and claims such expressions as vertical and horizontal to the plane of the earth are employed as a convenient means of expression, since the principles of operation embodied in the present machine are not dependent upon any particular relationship of the parts to the plane of the earth.

By maintaining the box sections in flatwise relation to one another during the loop forming and coiling operations, the wires at regions in the immediate proximity to the joints between the box sections remain in a straight or unbent condition, which is desirable in that any bending of the wires during the loop forming operations and prior to the ultimate erection of the box is objectionable as it tends to stretch the wires at the box joints and to impart permanent bends or kinks which when the box sections are flattened out for shipment prevent close packing, and when the box is ultimately set up tend to the formation of slackness and a bulging of the wires at the corner joints, which defects are avoided by maintaining the plane or flatwise relation of the wire connected box sections at all times until the ultimate erection of the box.

The present invention furthermore relates to the means provided for the formation of complementary loops at the opposite ends of each wire by mechanism which coils the free ends of the wires around the body of the wire without twisting the wire upon its longitudinal axis and thus distorting or abusing the structure of the wire itself.

The invention further relates to the means provided for adjusting the loop formers and coilers to accommodate variable longitudinal spacing of the wires along the box sections in such a way as to permit the adjustments to be made quickly and accurately by mechanism which simultaneously releases the operating train from each of the loop coiler heads so that the necessary adjustments can be made without individually releasing each loop coiler head by the manipulation of bolts, screws or the like.

The invention further relates to the general structure of the machine and the means provided for conveniently and rapidly feeding the box blanks first to one side of the machine and thereafter to the opposite side of the machine for the purpose of successively forming the loops at opposite ends of each wire section.

Further objects and details will appear from the description of the invention in conjunction with the accompanying drawings, wherein,—

General structure of the machine

The machine, as shown by way of exemplification, is mounted within a frame comprising two massive standards 31 and 32 respectively. Each of the standards is of the form shown in Fig. 8, and comprises an upper portion 33 of convergent configuration supported upon legs 34.

The standards are connected by means of a bridge 35 of wedge-shaped formation, which fits at each end within a converging recess 36 and is held in place by bolts 37 entered through flanges 38 which overlie the flattened upper ends of the standards.

The standards are connected near their middle by a platform 39 which not only serves to rigidly connect the standards but also affords a surface for the manipulation of the box blanks when it is necessary to shift them from one side of the machine to the other. The standards are also spanned at a higher elevation by an adjustable massive guide frame 40, which comprises side walls 41—41 and inturned flanges 42—42, upon each of which is formed a wedge-shaped guide rail 43.

The guide frame 40 serves on each side as a mounting for a plurality of adjustable brackets 44, each comprising a downwardly extending leg 45 provided with a slot 46, through which are entered headed screw bolts 47 which permit the bracket to be vertically adjusted.

Each bracket further comprises an outwardly extending shelf portion 48, and by aligning the shelf portions to the same horizontal plane, a support is provided for the infeeding of the edge section 49 of a box blank with the upturned end 50 of one of the cross wires, which unite the four box sections together.

Figure 1:
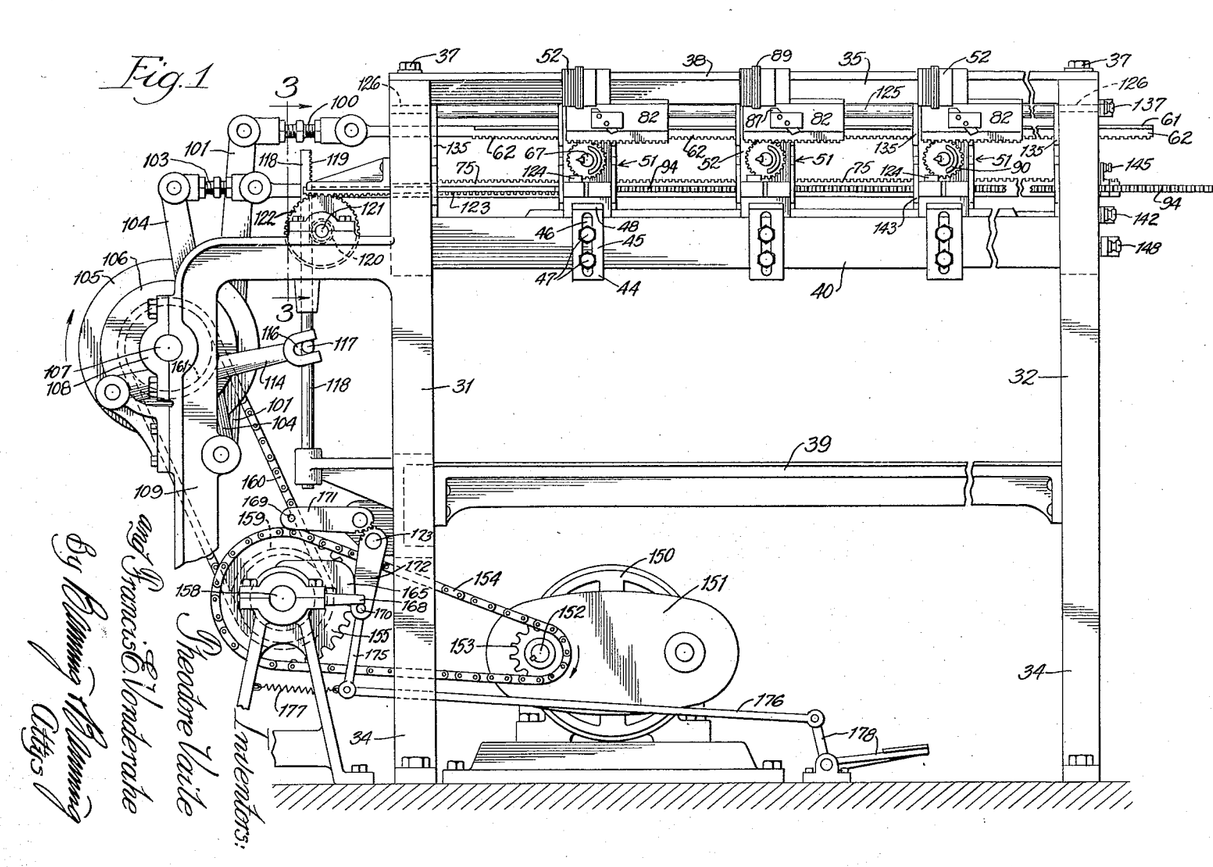
Figure 1 is a side elevation of the machine as a whole.
Figures 2, 3:
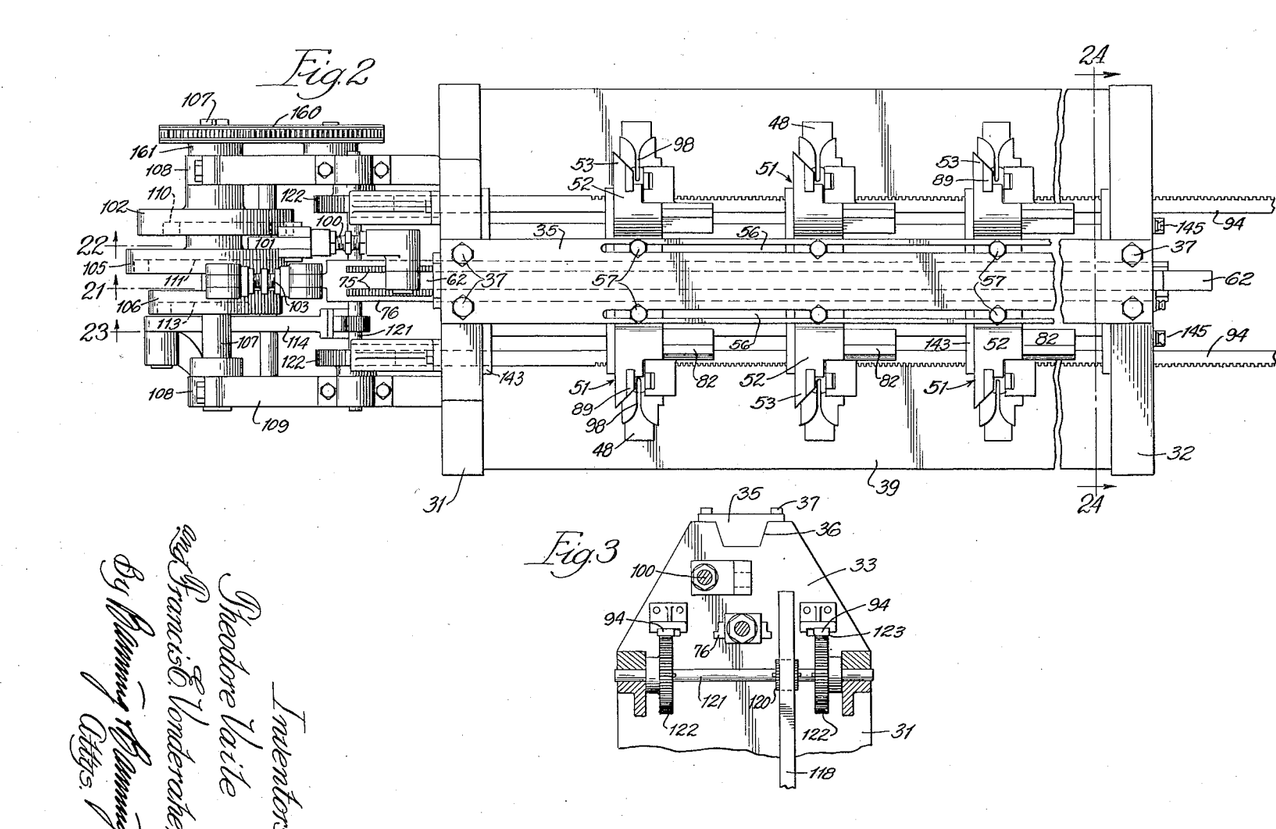
Fig. 2 is a top plan view of the same.
Fig. 3 is a detailed section taken on line 3—3 of Fig. 1.
Figure 4:
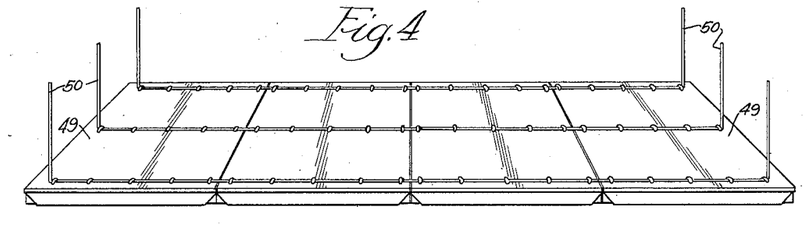
Fig. 4 is a perspective view of a box blank in the flatwise knock-down condition, with the ends of the wires upstanding for presentation to the loop coilers of the machine.
Figure 5:
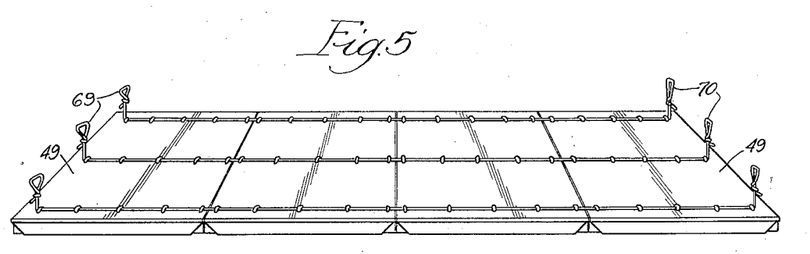
Fig. 5 is a similar view after the loops have been formed in opposite ends of the wire.

As shown in Fig. 1, each of the brackets 44 stands in adjacent relation to the end of one of the loop coiler heads, which in its entirety is designated by the numeral 51. However, since the loop coiler heads are longitudinally adjustable along the guide rails 43, it will be understood that there is no necessary correlation in position between the brackets 44 and the loop coiler heads.

Loop coiler heads

Figure 8:
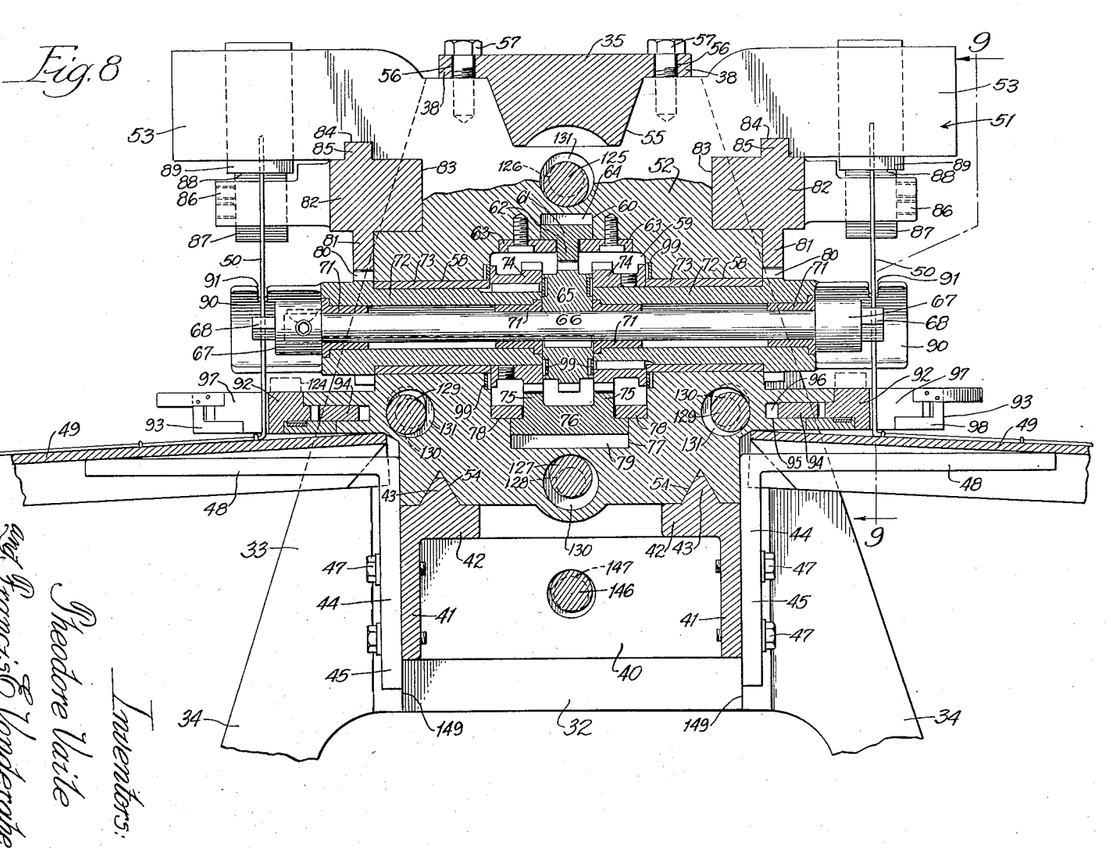
Fig. 8 is an enlarged sectional view on line 8—8 of Fig. 9 showing in section one of the loop forming and coiling heads and the eccentric means for leasing the operating racks to permit respacing of the loop coiler heads.

Each of the loop coiler heads is of the configuration and construction shown in Fig. 8, and comprises a massive casting 52 the body of which is of generally rectangular configuration and carries at each upper corner an outwardly projecting arm 53.

The body of the casting 52 is provided with grooves 54 along the lower edge, which ride upon the guide rails 43, and the upper edge of the casting is provided with a converging recess 55 which embraces the bridge 35, the flanges 38 of which are provided with elongated slots 56 which receive bolts 57 entered into the upper edge of the casting 52 and which permit the latter to be adjusted to conform to the spacing between the wires on the knock-down box.

Loop coiler anvils

Figures 9, 10, 11, 12:
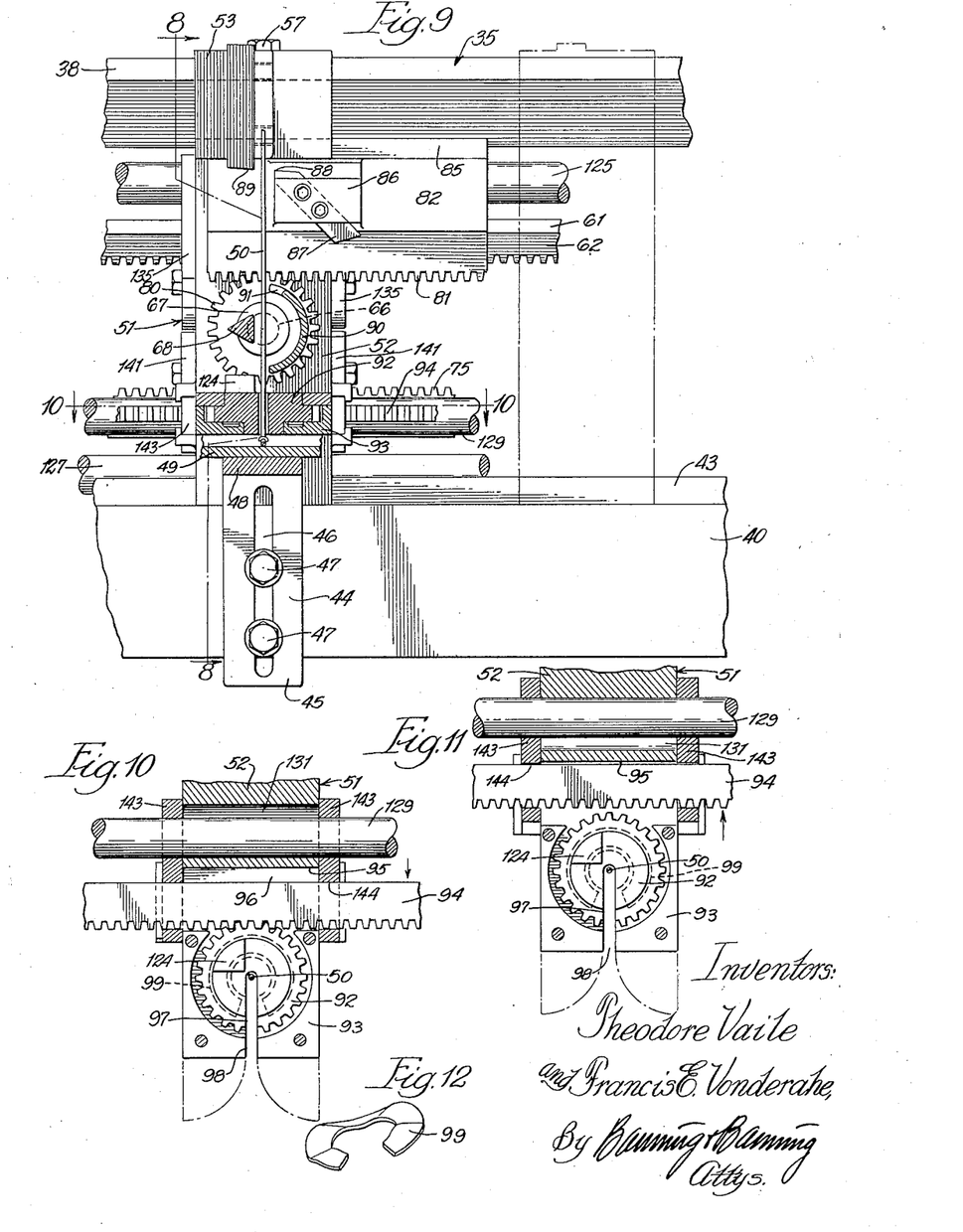
Fig. 9 is a sectional detail taken on line 9—9 of Fig. 8.
Figs. 10 and 11 are sectional plan views taken on line 10—10 of Fig. 9 showing the collar rack in operating and in released adjustment.
Fig. 12 is a perspective showing one of the split spring rings for frictionally holding one of the coilers to prevent maladjustment after the release of the rack.
Figure 20:
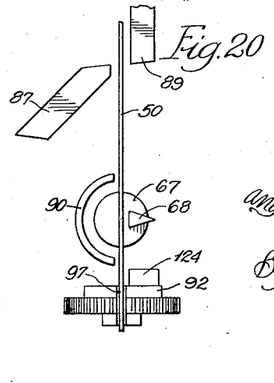
Fig. 20 is a similar detail showing the loop forming mechanism on the opposite side of the machine for forming one of the complementary loops.

Each of the castings 52 is provided with aligned center bores 58 which at their inner ends merge into a center recess 59, the upper wall of which is provided with a groove 60 which receives the head 61 of a T-shaped rack bar 62 which is held in place by the edges of inwardly projecting plates 63, the groove 60 being deep enough to afford a clearance space 64 to permit the rack bar to be lifted free from the teeth of a center pinion 65 with which it normally meshes. The pinion is mounted upon a shaft 66 which at each end carries a head block 67 from which an anvil block 68 outwardly protrudes. By reference to Figs. 8 and 9 it will be noted that the anvil block at the right hand end is of triangular formation and of greater width than the anvil block at the left hand end of the shaft, the dimensions of which latter are shown in Fig. 20. Save for the difference in shape of the anvil blocks, the construction at the two ends of the shaft is identical, but in view of the fact that one of the anvil blocks must form the larger loop 69 (Fig. 6) while the other anvil forms the smaller loop 70, it is necessary that the anvil forming the latter loop be of less width than the other.

The shaft 66 carries bushings 71 which furnish bearings for a sleeve shaft 72 which is journalled within bearing sleeves 73 mounted within the aligned bores 58. The sleeve shafts at their inner ends have keyed thereto oppositely facing pinions 74 which are engaged by two lines of rack teeth 75 upstanding from a center rack bar 76 which is slidable through a center recess 77 and held against displacement by overlapping plates 78.

The center recess 77 is of sufficient depth to afford a clearance 79 to permit the center rack bar 76 to be lowered to disengage the teeth of the pinions 74.

Cutter mechanism

The sleeve shaft 72 near each end is provided with spur teeth 80 which constitute a pinion meshing with a rack 81 carried by a cutter head 82 which is fitted into position within an inwardly cut notch 83 formed in the contiguous side wall of the casting 52 immediately beneath the adjacent overhanging arm 53, which arm is provided with a groove 84 to receive a fin 85 upstanding from the cutter head 82.

Each cutter head carries an outstanding block 86 through which is inserted a movable cutter 87 standing in oblique relation and presenting its cutting corner 88 in position to coact with a fixed cutter 89 which is carried by the outwardly projecting arm 53, the relation between the cutters being such that as the rack 81 is moved by the rotation of the spur teeth 80, the surplus at the end of the upstanding wire 50 will be cut away before the wire is bent around the anvil by the mechanism presently to be described, thus insuring uniformity in the lengths of the wire preparatory to the coiling operation.

Loop formers and coilers

Each sleeve shaft 72 at its outer end is provided with an arcuate extension 90 in the form of a semi-cylindrical shell, which is provided in its leading edge with a notch 91 positioned to engage the upstanding wire and draw it around the anvil 68 as the sleeve shaft is rotated.

Immediately below the mechanism last described, which operates on a horizontal axis, is located a coiler 92 in the form of a pinion rotatable upon a vertical axis and journalled within a circularly recessed housing 93. The coiler pinion 92 is in mesh with a rack 94 which presents its teeth outwardly and is mounted within a groove 95 affording a clearance space 96 behind the rack to permit the rack to be withdrawn from engagement with the coiler pinion. In order to permit the upstanding end of the wire 50 to be inserted to position in concentric relation with the axis of the coiler pinion, the latter is provided on one side with a slot 97 which registers with a slot 98 in the housing.

Since it is necessary in making adjustments, and while the operating parts are disengaged from the racks which operate them, to maintain these parts in their correct relation to one another, means are provided to impart sufficient friction to the rotating elements to prevent accidental displacement. Such means are shown in the form of split corrugated spring rings 99 of the character illustrated in Fig. 12, which are interposed between the pinions 65, 74 and 92 and the respective bearings therefor.

Cam mechanism

The means for imparting time movements to the respective racks will now be described.

Figures 21, 22, 23:
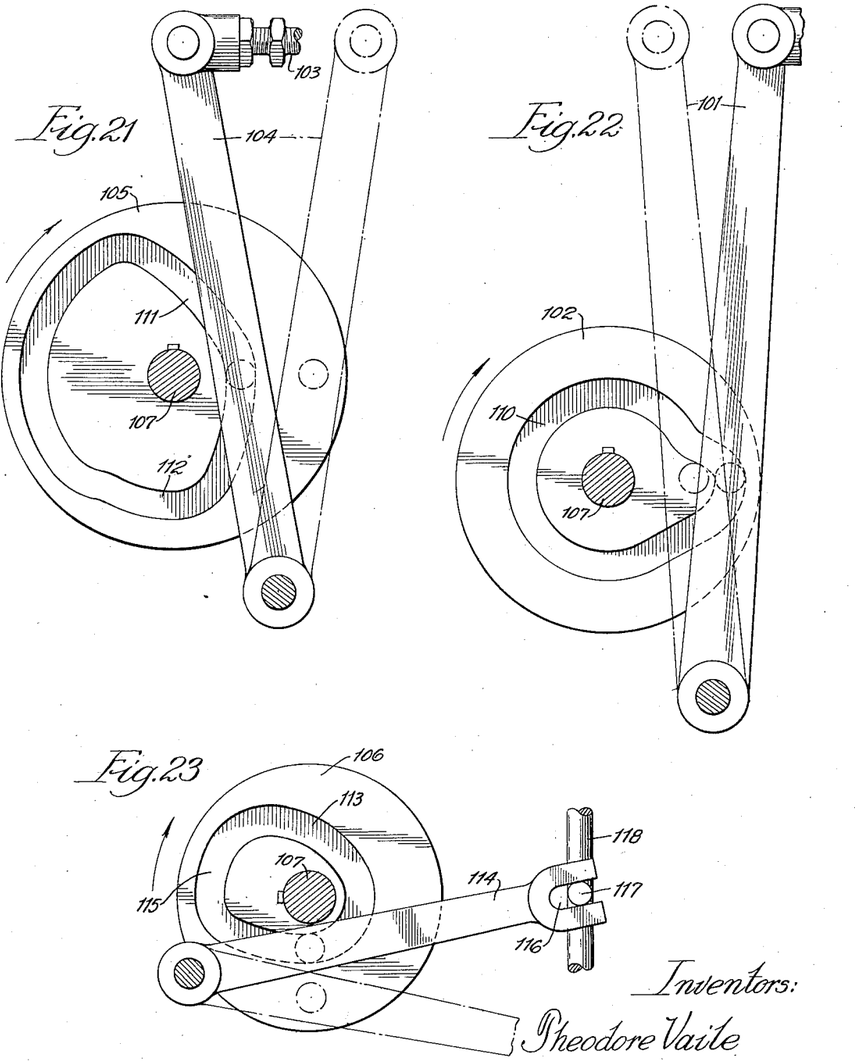
Figs. 21, 22 and 23 are sectional views taken on lines 21, 22, 23, respectively, of Fig. 2, showing the three cams which operate the three sets of mechanisms employed in the loop forming and coiling operations.

Referring to Fig. 1, the rack bar 62 is connected by a link 100 with a lever arm 101 shown in detail with the associated cam 102 in Fig. 22.

The double rack bar 76 is connected by a link 103 with a lever arm 104 shown in detail with the associated cam 105 in Fig. 21.

The racks 94 are connected, through mechanism presently to be described, with the cam 106 and associated mechanism shown in Fig. 23.

The three cams are carried by a transversely extending cam shaft 107 which is journalled within journal brackets 108 mounted upon standards 109 which constitute an extension at one end of the machine.

The cam 102 is provided with a cam groove 110 which is concentric throughout approximately 225° and is offset outwardly throughout the remainder of the cycle.

The position of the parts in full line in Fig. 22 is the position occupied at the beginning of an operative cycle, so that with the cam moving in the direction indicated by the arrow, the arm 101 will be abruptly drawn back into the dotted line position during the initial portion of the cycle and thereafter remain at rest throughout the remainder of the cycle. This cam controls the rotation of the shaft 66 carrying the anvils 68, so that, as indicated in Figs. 13 to 17 inclusive, the only movement imparted will be that required to move the anvil from the laterally projecting position shown in Fig. 13 to the down pointing position shown in the remaining figures, the anvil thus standing at rest throughout the major portion of the operation and until it is restored by the terminal portion of the cam through a return movement illustrated diagrammatically in Fig. 19.

The double rack bar 76, being under the control of the lever arm 104 and the cam 105, will be given an initial movement represented by that portion of the cam groove indicated by 111, after which it will remain in the dotted line position throughout about 90° of movement and be restored by varying stages of movement under the control of the terminal portion 112 of the cam groove.

Figure 13:
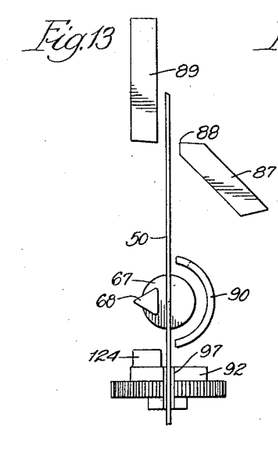
Figs. 13, 14, 15, 16, 17 and 18 are diagrammatic views showing the successive positions occupied by the looping, coiling and cutting mechanisms during the formation of the loop and the coiling of the free end around the body of the wire, all being taken from one side of the machine.
Figures 14, 15:
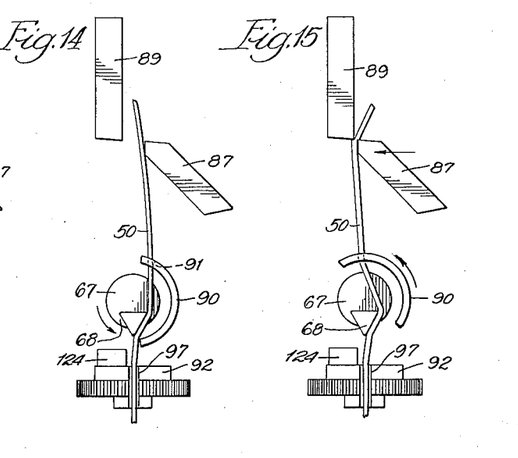
Figure 19:
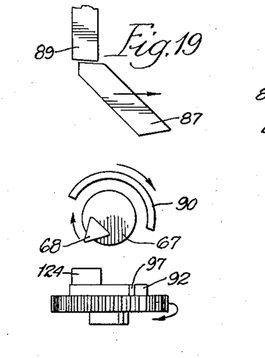
Fig. 19 is a similar view showing the adjustment of the parts during the restoring operation after a set of loops has been completed.

The cam 105 controls the movements of the duplicate sleeve shaft sections, which operate in unison and rotate the arcuate notched shells 90, which serve to carry the free ends of the wires around the anvil through the series of operations illustrated in Figs. 13 to 18 inclusive, with a restoring movement illustrated in Fig. 19. A study of these figures indicates that the shell 90 will remain at rest during the initiatory movement of the anvil which carries the wire into contact with the lower or rear edge of the shell, as indicated in Fig. 14. Immediately thereafter, the shell begins to rotate in a direction opposite to the previous movement of the anvil, which carries the wire around the anvil to the position indicated in Fig. 16, in preparation for the final coiling operation by the coiler which prior to this time has remained stationary.

The coilers on opposite sides of the machine are operated through the outwardly presented racks 94, both of which are operated in unison by the cam 106 through connections now to be described.

The cam 106 is provided with a cam groove 113 which actuates a lever 114, which in Fig. 23 is shown in full lines in the initial position. As the cam rotates in the direction indicated by the arrow, the lever 114 will remain stationary throughout about 120° of movement, after which it will be moved downwardly to the dotted line position, where it will remain stationary during the traverse of the outermost section 115 of the cam groove, after which it will be quickly restored to the initial position.

The lever 114 is bifurcated at its free end 116 to engage a pin 117 on a rod 118, which at its upper end carries a rack 119 meshing with a small pinion 120 on a secondary shaft 121, which at each end carries a pinion 122 in mesh with a downwardly presented rack 123 on the end of the rack 94, so that the movements of the cam 106 will, through the rack train and connections described, be reflected in the movements of the coiler pinions 92. Each of these pinions is provided with an upstanding coiler block 124 of segmental shape (see Fig. 10), the inner angle of which lies closely adjacent to the inner terminus of the slot 97 and hence in close proximity to the position occupied by the upstanding wire section 50.

Loop forming and coiling operations

Figure 16:
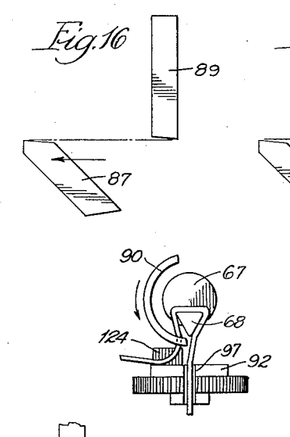
Figures 17, 18:
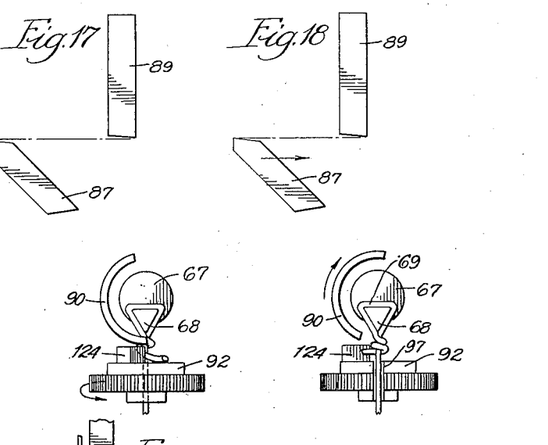

During the loop forming operations illustrated in Figs. 13, 14 and 15, the coiler block 124 stands in or near its normal retracted position, but after the loop has been formed, as shown in Fig. 16, by the partial rotation of the shell 90, the coiler block rotates into position to engage the free end of the loop and carry it twice around the body of the wire, during which interval it is coiled up into the close coil shown in Fig. 18, with a short terminus projecting outwardly from the coil and in position to lie in flatwise relation when the wire section is ultimately laid flat against the surface of the box.

Rack releasing mechanism

Since it is essential, during the adjustments of the loop coiler heads, that the racks be disengaged from their respective pinions, mechanism is provided which permits easy and convenient retraction of the racks as occasion may require.

Figure 24:
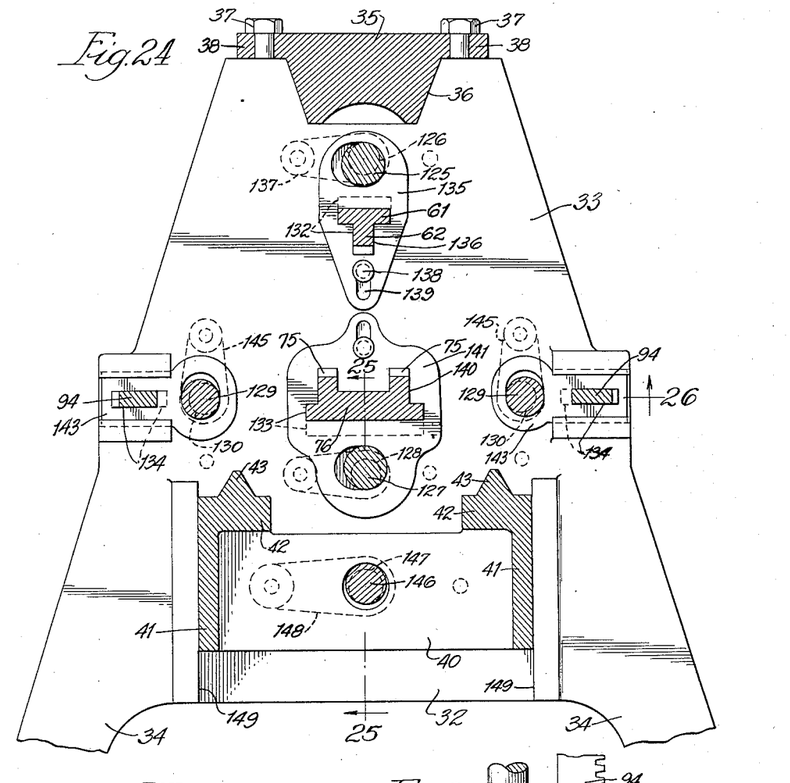
Fig. 24 is an end elevation of the machine taken on line 24—24 of Fig. 2.

Referring to Figs. 8 and 24, the rack 62 is retracted by an eccentric shaft 125 having trunnions 126 at its ends, which are journalled through the respective standards.

The double rack 76 is retracted by an eccentric shaft 127 having at its ends trunnions 128 which are journalled through the respective standards.

Likewise, the racks 94 are retracted by eccentric shafts 129 having trunnions 130 which are journalled through the respective standards.

In order to afford clearance for the movements of the respective eccentric shafts, each of the loop coiler heads is provided with a clearance aperture 131 for each of the eccentric shafts to allow turning thereof on the end trunnions.

The standards afford supporting guideways for the ends of the racks, the rack 62 being guided at each end through a T-shaped guide aperture 132 (Fig. 24); the double rack bar 76 being guided through apertures 133 of corresponding shape; and the racks 94 being guided through apertures 134. Each of the apertures referred to is of adequate dimensions to afford clearance for the retraction of the respective racks out of meshing relation with the pinions with which they are associated.

The rack 62 is slidably mounted within a series of plates 135, of which two are carried by each of the loop heads and one by each of the standards. Each of these plates is provided with a T-shaped aperture 136 similar to the aperture 132, but of reduced vertical dimensions to omit the clearance provided by the aperture 132, so that as the plates 135 are raised and lowered they will carry with them the rack 62 which will be free to move vertically within the clearance afforded by the end apertures 132.

Each of the plates 135 embraces the eccentric shaft 125, so that as the latter is turned upon its trunnions 126, the entire group of plates will be uniformly lifted, thereby imparting a uniform lifting movement throughout the length of the rack bar, so that it will be simultaneously disengaged from all of the pinions 65 in the several loop coiler heads. Convenient operation of the eccentric shaft is afforded by a handle 137 which is keyed to one of the trunnions 126 (see Fig. 24). The lower end of the plate 135 is guided by a pin 138 operating through a slot 139.

Figure 25:
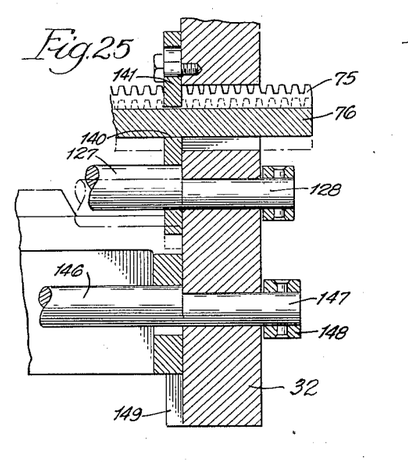
Fig. 25 is a sectional detail taken on line 25—25 of Fig. 24.

As shown in Fig. 25, the double rack bar 76 is guided through apertures 140 in adjusting plates 141 similarly disposed with respect to the loop coiler heads and the end standards, the apertures 140 being of lesser vertical dimensions than the apertures 133 to afford a close sliding fit for the rack, and in like manner the entire group of plates 141 are apertured to receive the eccentric shaft 127 which is adjusted by the operation of a handle 142 mounted upon one of the trunnions 128.

Figure 26:
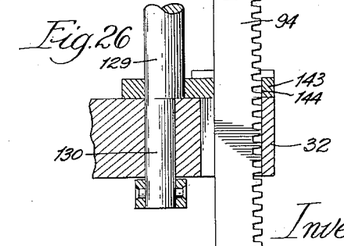
Fig. 26 is a sectional detail taken on line 26 of Fig. 24.

As shown in Fig. 26, each of the racks 94 is guided through a group of plates 143, each provided with an aperture 144 of lesser dimensions than the apertures 134, and the plates 143 are apertured to receive the related eccentric shaft 129 operated by a handle 145, so that by operating the handles 145 the racks 94 may be disengaged from the coiler pinions.

In order to lock the loop coiler heads in position after adjustment, the guide frame 49 is supported upon an eccentric shaft 146 (Figs. 8 and 25) provided with trunnions 147 one of which has keyed thereon a handle 148. The ends of the guide frame are slidably mounted against shoulders 149 formed on the inner faces of the standards, so that the guide frame will be held against lateral or torsional movement but will be free to adjust vertically as the eccentric shaft 146 is rotated. Such vertical adjustment causes the guide rails 43 to wedge tightly within the V-shaped grooves 54 in the lower edges of the respective loop coiler heads, so that when the guide frames 49 are lifted slightly by the rotation of the eccentric shaft 146, each of the guide heads will be clamped tightly between the wedge-shaped bridge 35 and the guide frame.

*Clutch mechanism*

Power for operating the machine is applied by a motor 150 operating through a reduction train 151 to drive a sprocket shaft 152 carrying a sprocket 153 which operates a sprocket chain 154 carried over a sprocket wheel 155 having a hub 156 which is freely mounted upon a sleeve 157 keyed upon a clutch shaft 158 carrying a sprocket 159 engaging a sprocket chain 160 which drives a sprocket wheel 161 keyed upon the cam shaft 107.

Figure 29:
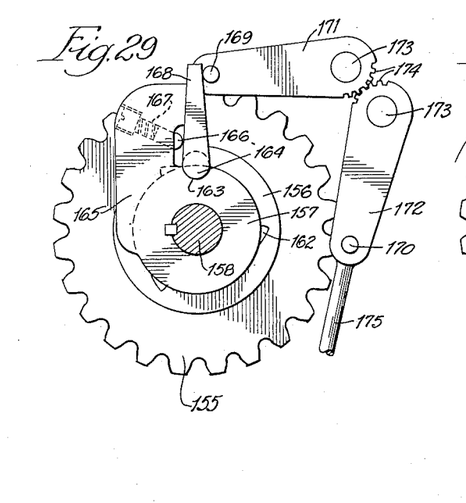
Figs. 29 and 30 are further details of the clutch mechanism showing different positions of adjustment.

The hub 156 is provided on its inner face with a plurality of notches 162, and the sleeve 157 has formed in its periphery a half-cylindrical journal recess 163 which journals a half cylindrical clutch block 164 having an outer face concentric with the curvature of the sleeve, so that when the clutch block is turned as in Fig. 29, it will register with the surface of the sleeve and allow the hub 156 to rotate freely. When, however, the clutch block is turned into the projecting position shown in Fig. 30, it will present itself in projecting relation to snap into one of the notches 162.

Figure 30:
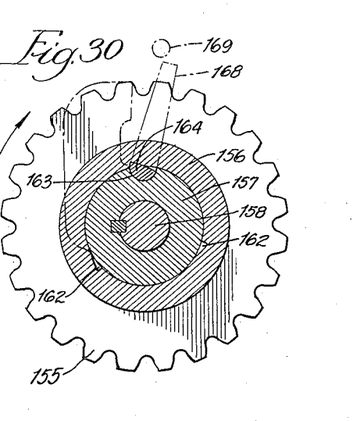

The sleeve 157 is provided on one side with an outwardly projecting housing 165 which is bored to socket a pin 166 backed by a spring 167 which bears against a lever arm 168 secured to the block 164, so that in the absence of restraint the arm will be forced into the clutching relation shown in Fig. 30. In order to limit the operation of the clutch elements, a pair of stop pins 169 and 170 are provided, which are separated by 90° from one another in relation to a cycle of rotation of the clutch shaft 158. The pin 169 is mounted upon the free end of an arm 171 and the pin 170 is mounted upon the free end of an arm 172, the respective arms being pivoted upon closely adjacent pintles 173, and the contiguous portions of the arms being provided with gear teeth 174, so that they will be operated in unison.

The arm 172 has depending therefrom a rod 175 which connects with a draw rod 176 operating against the tension of a spring 177, which draw rod is pivoted to a foot treadle 178.

Figure 27:
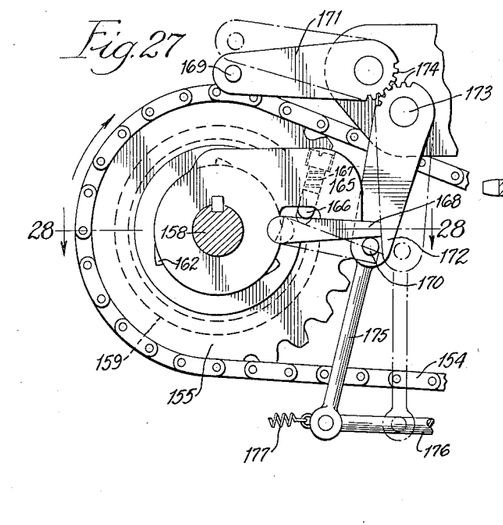
Fig. 27 is a detail showing the intermittent clutch mechanism with the parts in arrested position.
Figure 28:
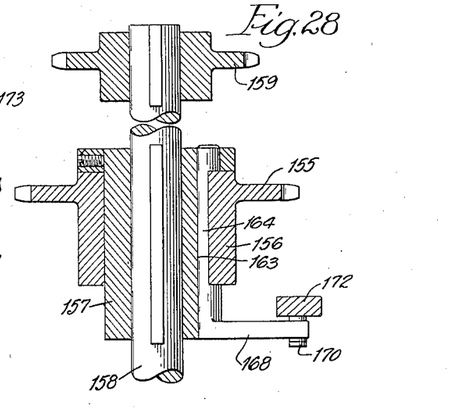
Fig. 28 is a sectional detail taken on line 28—28 of Fig. 27.

The arrangement is such that when the foot treadle is first momentarily actuated it will retract the arm 172 which will in turn lift the arm 171, so that at the same instant the stop pins 169 and 170 will be retracted. With the parts in the unclutched relation shown in Fig. 27, the arm 168 will thus be free under spring tension to assume the position shown in Fig. 30 and to snap into one of the clutch notches 162, thereby clutching the parts together and initiating the operation of the machine. Immediately thereafter the operator releases the foot treadle so that the arms 171 and 172 are restored to stopping position, and after a three-quarter revolution the arm 168 will encounter the pin 169 (Fig. 29) and automatically release the clutch. This completes the first stage in the cycle of operations.

The second stage is initiated by a second depression of the foot treadle, which releases the arm 168 from the pin 169 and allows the parts to clutch together for a restoring one-quarter revolution, thereby completing the cycle.

Summary of operations

In the use of the machine, two operators may most conveniently be employed, one operator standing on each side of the machine. The first operator lays a flat knock-down bound box on the aligned set of brackets 44 on one side of the machine and shoves the bound box sections inwardly, with the wires upstanding in position to enter the slots 97 in the coiler pinions, which in this position are presented outwardly to receive the wires. Immediately thereafter the foot treadle is operated to initiate the first stage in the cycle. With the parts clutched to the drive mechanism, the cam shaft will be operated throughout three-quarters of revolution, during which period all of the looping and coiling operations will be performed and the machine will come to rest in position to permit the removal of the box sections prior to the restoration of the parts during the second stage in the cycle of operations.

The first movement in the timed sequence operates the anvil through 90° from the position shown in Fig. 13 to the position shown in Fig. 14, and during this operation, with the shell 90 standing at rest, an initial deflection of the wire will occur, which brings a medial portion thereof into flatwise contact with the triangular anvil and carries the wire into the notch 91 in the shell 90. Immediately thereafter the shell begins to turn through the range of movements indicated in Figs. 15 and 16, which loops the wire around the anvil, forming a still open triangular loop with the terminus bent backwardly by contact with the face of the coiler pinion and immediately in front of the coiler block 124. Thereafter the coiler block begins to rotate and carries the terminus of the wire twice around the body of the wire, as in Figs. 17 and 18, during which operation the shell recedes slightly to afford the necessary clearance. This completes the forming operation, which terminates with the slots in the coiler pinions presented outwardly to permit removal of the box. Immediately after the removal, the operator again depresses the foot treadle, which clutches the parts for a restoring movement of 90° back to the initial position. During the rotation of the coiler shell the movable cutters advance and sever the surplus wire, the range of movements of the cutter being indicated in Figs. 13 to 20 inclusive.

After the box has been removed from the machine, with the larger loops formed as above described, it is shoved through the machine upon the platform 39 and grasped by the operator on the opposite side of the machine, with the previously unlooped wires standing upwardly at the inner side of the box blank with relation to the second operator. This enables the box blank without further manipulation to be lifted and placed upon the brackets on the second operator's side of the machine, and the loop forming operation is repeated in the manner previously described.

In view of the fact that the second set of loops must be sufficiently narrow to slip through the loops first formed, the anvils around which the second set of loops are bent are of the narrower configuration shown in Fig. 20, but in all other respects the operations are identical.

It will be observed from the above description that during the formation of the loops at each end of each wire section, the body of the wire lies flat across the box sections without the necessity for bending the wires at the joints, so that after the loops have been formed there will be no bends or kinks at the joints, which are objectionable for reasons previously stated.

Figures 6, 7:
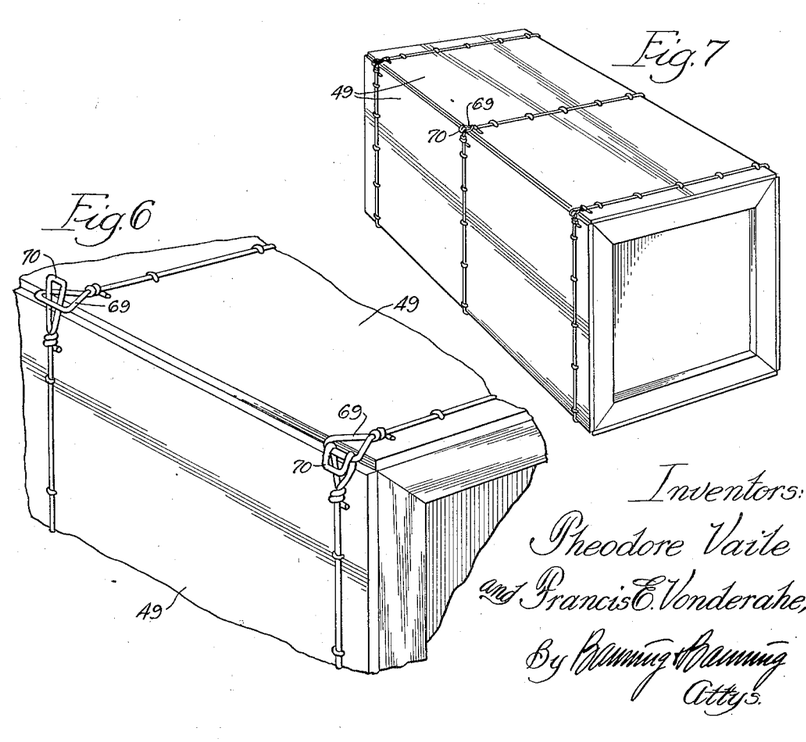
Fig. 6 is an enlarged perspective detail showing the co-operative relation of the loops in the closing and fastening of the box.
Fig. 7 is a perspective of the completed box closed and fastened.

The wires are stapled to the box sections in the usual manner, the staples being so located as to permit the ends of the wires to be bent upwardly for loop coiling at a slight distance inwardly from the edges of the box blanks, so that after the loops are formed the free looped ends of the wires may be bent downwardly to present the loops in such projecting relation that they will register with one another as in Fig. 6, when the box is erected, so that the smaller loop, after insertion through the larger loop, may be hooked over to clamp and hold the box in closed relation.

The method of forming the loops is one which insures uniformity in the length of the wire with resulting uniformity in the positioning of the loops, which is essential in order to secure a tight closure for the completed box, and at the same time the method of coiling employed is one which is to be distinguished from a twisting operation which imparts a twist into the looped end of the wire and thus distorts the metal and tends to weaken it in some degree.

The loops formed by the present machine are secured by coils rather than twists, and with the free ends of the coils extending outwardly in position to lie flatwise upon the surface of the box, the loops will resist uncoiling, so that strong tension may be exerted in hooking the loops together without danger that the loops will give way under the tension exerted.

Although the invention has been described with particularity as to detail, it is not the intention, unless otherwise indicated in the claims, to limit the invention to the precise form of mechanism shown and described, since modifications thereof may be introduced without departing from the spirit of the invention.

Furthermore, although the loop forming and coiling mechanisms herein described are associated in a machine that is designed to loop and coil the ends of box wires, the looping and coiling mechanism may itself be employed in mechanisms designed for other purposes, so that unless so claimed it is not the intention to limit the use of these features to wire bound box forming operations.

Moreover, in the claims, where coilers or coiling operations are referred to, it is not the intention to limit the subject matter thereof to coilers as distinguished from twisters, unless the claims are restricted to the use of features which are special to a true coiling operation, since many of the claims are directed to combinations which are useful independently of the special means for securing the loops at the ends of the wire sections.

We claim:

1. In mechanism of the class described, the combination of a rotatably mounted coiler provided with a slot extending inwardly from one edge to the axis of the coiler and provided with a decentered coiling member mounted to engage the free end portion of a wire when positioned and coil the same around the body of the wire, and loop forming means adapted when actuated to loop back the free end of a section of wire extending through the center of the coiler and present the same in position to be engaged by the coiling member.

2. In mechanism of the class described, the combination of a rotatably mounted coiler provided with a slot extending inwardly from one edge to the axis of the coiler and provided with a decentered coiling member mounted to engage the free end portion of the wire when positioned and coil the same around the body of the wire, and rotatable loop forming means journalled at right angles to the axis of the coiler and adapted when actuated to loop back the free end of a section of wire extending through the center of the coiler and present the same in position to be engaged by the coiling member.

3. In mechanism of the class described, the combination of a rotatably mounted coiler provided with a slot extending inwardly from one edge to the axis of the coiler and provided with a decentered coiling member mounted to engage the free end portion of a wire when positioned and coil the same around the body of the wire, and loop forming means adapted when actuated to loop back the free end of a section of wire extending through the center of the coiler and present the same in position to be engaged by the coiling member, the loop forming means including an anvil adapted to have the free end of the wire wound thereupon, and a member rotatable relatively to the anvil and adapted to carry the wire around the anvil.

4. In mechanism of the class described, the combination of a rotatably mounted coiler provided with a slot extending inwardly from one edge to the axis of the coiler and provided with a decentered coiling member mounted to engage the free end portion of the wire when positioned and coil the same around the body of the wire, and rotatable loop forming means journalled at right angles to the axis of the coiler and adapted when actuated to loop back the free end of a section of wire extending through the center of the coiler and present the same in position to be engaged by the coiling member, the loop forming means including an anvil adapted to have the free end of the wire wound thereupon, and a member rotatable relatively to the anvil and adapted to carry the wire around the anvil.

5. In mechanism of the class described, the combination of a rotatably mounted coiler provided with a slot extending inwardly from one edge to the axis of the coiler and provided with a decentered coiling member mounted to engage the free end portion of a wire when positioned and coil the same around the body of the wire, and loop forming means adapted when actuated to loop back the free end of a section of wire extending through the center of the coiler and present the same in position to be engaged by the coiling member, the loop forming means including an anvil adapted to have the free end of the wire wound thereupon, and an arcuately formed shell shaped member provided with a notch to engage the wire and rotatable relatively to the anvil and adapted to carry the wire around the anvil.

6. In mechanism of the class described, the combination of a rotatably mounted coiler provided with a slot extending inwardly from one edge to the axis of the coiler and provided with a decentered coiling member mounted to engage the free end portion of the wire when positioned and coil the same around the body of the wire, and rotatable loop forming means journalled at right angles to the axis of the coiler and adapted when actuated to loop back the free end of a section of wire extending through the center of the coiler and present the same in position to be engaged by the coiling member, the loop forming means including an anvil adapted to have the free end of the wire wound thereupon, and an arcuately formed shell shaped member provided with a notch to engage the wire and rotatable relatively to the anvil and adapted to carry the wire around the anvil.

7. In mechanism of the class described, the combination of a frame consisting of spaced end standards and connections between the same, loop coiler heads each carrying duplicate outwardly facing mechanisms for forming loops on wires presented to each side of the machine, and a platform within the frame and adapted to facilitate transfer of wire bound box sections from one side of the machine to the other to permit loop forming operations to be successively performed on opposite ends of the box wires.

8. In mechanism of the class described, the combination of a frame consisting of spaced end standards and connections between the same, loop coiler heads each carrying duplicate outwardly facing mechanisms for forming loops on wires presented to each side of the machine, said mechanisms including slotted coilers adapted when in initial position to present their slots outwardly to receive upstanding wires presented laterally thereinto, and a platform within the frame and adapted to facilitate transfer of wire bound box sections from one side of the machine to the other to permit loop forming operations to be successively performed on opposite ends of the box wires.

9. In mechanism of the class described, the combination of a frame consisting of spaced end standards and connections between the same, loop coiler heads adjustable relatively to one another within the frame, each loop coiler head carrying duplicate outwardly facing mechanisms for forming loops on wires presented to each side of the machine, and a platform within the frame and adapted to facilitate transfer of wire bound box sections from one side of the machine to the other to permit loop forming operations to be successively performed on opposite ends of the box wires.

10. In mechanism of the class described, the combination of a frame consisting of spaced end standards and connections between the same, loop coiler heads adjustable relatively to one another within the frame, each loop coiler head carrying duplicate outwardly facing mechanisms for forming loops on wires presented to each side of the machine, said mechanisms including slotted coilers adapted when in initial position to present their slots outwardly to receive upstanding wires presented laterally thereinto, and a platform within the frame and adapted to facilitate transfer of wire bound box sections from one side of the machine to the other to permit loop forming operations to be successively performed on opposite ends of the box wires.

11. In mechanism of the class described, the combination of a frame consisting of spaced end standards and connections between the same, loop coiler heads each carrying duplicate oppositely disposed outwardly facing mechanisms for forming loops on wires presented to opposite sides of the machine, said mechanisms including slotted coilers adapted when in initial position to present their slots outwardly to receive upstanding wires presented laterally thereinto and means for supporting the wires in upstanding relation for presentation to the coilers.

12. In mechanism of the class described, the combination of a frame consisting of spaced end standards and connections between the same, a plurality of loop coiler heads in spaced relation to one another and adjustable relatively to one another within the frame, each loop coiler head carrying duplicate oppositely disposed outwardly facing mechanisms for forming loops on wires presented to opposite sides of the machine and means extraneous of the loop coiler heads for maintaining the wires in position for presentation inwardly toward the loop forming mechanisms.

13. In mechanism of the class described, the combination of a frame consisting of spaced end standards and connections between the same, and loop coiler heads adjustable relatively to one another within the frame, each loop coiler head carrying duplicate outwardly facing mechanisms for forming loops on wires presented to each side of the machine, said mechanisms including slotted coilers adapted when in initial position to present their slots outwardly to receive upstanding wires presented laterally thereinto.

14. In mechanism of the class described, the combination of a main frame, a plurality of loop coiler heads mounted within the frame in spaced relation to one another and adjustable to vary the spacing between the heads, each head carrying mechanisms for forming loops in the ends of wires, rack means for operating said mechanisms, said rack means being mounted for retraction to disengage from the said mechanisms to permit adjustment of the heads, and means for effecting such retraction of the rack means.

15. In mechanism of the class described, the combination of a main frame, a plurality of loop coiler heads mounted within the frame in spaced relation to one another and adjustable to vary the spacing between the heads, each head carrying mechanisms for forming loops in the ends of wires, racks for operating said mechanisms, said racks being mounted for retraction to disengage simultaneously from the said mechanisms of the several loop coiler heads to permit adjustment of the heads, and means for effecting such retraction of the racks, said means comprising eccentric shafts and movable guide plates for the racks, so related as to effect movement of the guide plates by a turning of the shafts.

16. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, a vertically adjustable guide frame for supporting the loop coiler heads and along which said heads are adjustable, and means for vertically moving said guide frame to clamp the heads between the guide frame and portions of the main frame.

17. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, said means comprising eccentric shafts and movable guide plates for the racks, so related as to effect movement of the guide plates by a turning of the shafts, a vertically adjustable guide frame for supporting the loop coiler heads and along which said heads are adjustable, and means for vertically moving said guide frame to clamp the heads between the guide frame and portions of the main frame.

18. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, a vertically adjustable guide frame for supporting the loop coiler heads, the guide frame and the heads being provided with complementary wedge grooves and ribs, and means for vertically moving said guide frame to wedge the heads between the guide frame and portions of the main frame.

19. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, said means comprising eccentric shafts and movable guide plates for the racks, so related as to effect movement of the guide plates by a turning of the shaft, a vertically adjustable guide frame for supporting the loop coiler heads, the guide frame and heads being provided with complementary wedge grooves and ribs, and means for vertically moving said guide frame to wedge the heads between the guide frame and portions of the main frame.

20. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, a vertically adjustable guide frame for supporting the loop coiler heads and along which said heads are adjustable, and eccentric means for vertically moving said guide frame to clamp the heads between the guide frame and portions of the main frame.

21. In mechanism of the class described, the combination of a main frame, a plurality of loop coiler heads mounted within the frame and adjustable to vary the spacing between the heads, each head carrying mechanisms for forming loops in the ends of wires, racks for operating said mechanisms, said racks being mounted for retraction to disengage from the said mechanisms to permit adjustment of the heads, and means for effecting such retraction of the racks, said means comprising eccentric shafts and movable guide plates for the racks, so related as to effect movement of the guide plates by a turning of the shafts, a vertically adjustable guide frame for supporting the loop coiler heads and along which said heads are adjustable, and eccentric means for vertically moving said guide frame to clamp the heads between the guide frame and portions of the main frame.

22. In mechanism of the class described, the combination of a frame consisting of spaced end standards and connections between the same, transversely extending loop coiler heads each mounting oppositely outwardly facing and axially aligned mechanisms for forming loops on wires presented inwardly on opposite sides of the machine, and supporting means on opposite sides of the machine adapted to maintain the wires in proper position for presentation inwardly toward the loop coiler heads.

THEODORE VAILE.
FRANCIS E. VONDERAHE.